S. R. GUY.
STORAGE BATTERY.
APPLICATION FILED SEPT. 10, 1919.
1,377,148.
Patented May 3, 1921.
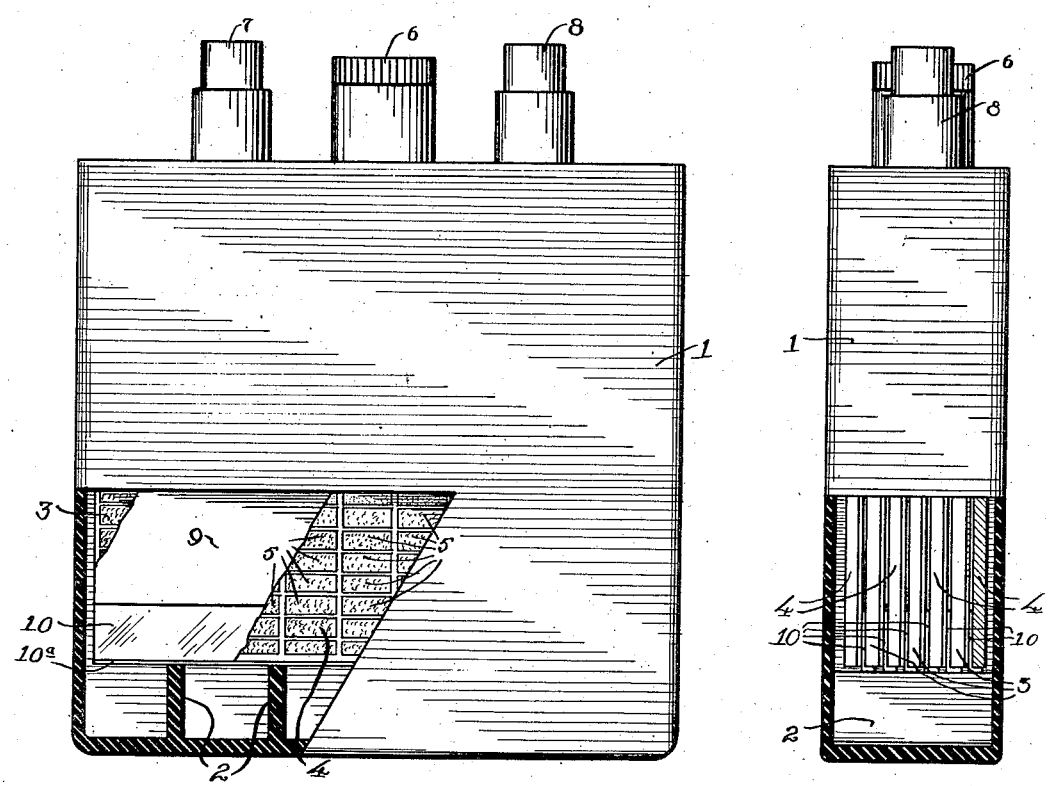
Fig.1.
Fig.2.
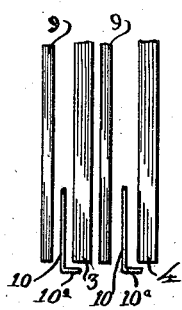
Fig.3.
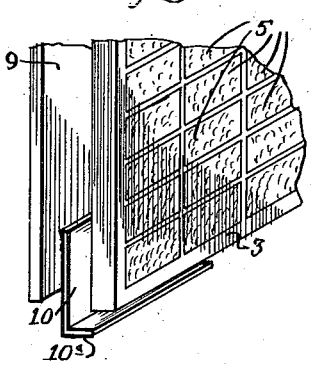
Fig.4.
INVENTOR,
Samuel R. Guy;
BY
ATTORNEY.

UNITED STATES PATENT OFFICE.

SAMUEL R. GUY, OF LOS ANGELES, CALIFORNIA, ASSIGNOR TO HOBBS STORAGE BATTERY CO., OF LOS ANGELES, CALIFORNIA, A CORPORATION OF CALIFORNIA.

STORAGE BATTERY.

1,377,148.	Specification of Letters Patent.	Patented May 3, 1921.

Application filed September 10, 1919. Serial No. 322,928.

*To all whom it may concern:*

Be it known that I, SAMUEL R. GUY, a citizen of the United States, residing at Los Angeles, in the county of Los Angeles and State of California, have invented new and useful Improvements in Storage Batteries, of which the following is a specification.

The present invention relates to certain new and useful improvements in electric batteries, more particularly storage batteries, and has for its object to provide a separating means for the positive and negative plates which embodies novel features of construction whereby longer life and greater efficiency is obtained from the battery.

Further objects of the invention are to provide an improved separating means for the plates of storage batteries and the like which can be installed in the conventional battery construction at only a very slight increase in cost over the usual construction, which will overcome the tendency of the metal plates of the battery to wear through the lower edges of the separator plates by the rubbing action caused by the jarring of the battery when installed upon a motor vehicle, and which by preventing the premature short-circuiting of the metal plates at the lower edges thereof will very materially prolong the life of the battery and enable increased efficiency to be obtained therefrom.

With these and other objects in view, the invention consists in certain novel combinations, arrangements and associations of the parts, as will more fully appear as the description proceeds, the novel features thereof, being pointed out in the appended claims.

For a full understanding of the invention, reference is to be had to the following description and accompanying drawing, in which:

Figure 1 is a side elevation of a storage battery provided with separating means embodying the invention, portions being broken away and shown in sections to illustrate more clearly the details of construction;

Fig. 2 is an end view of the battery with portions broken away and shown in section;

Fig. 3 is an enlarged detail perspective view of portions of the battery, the parts being separated, and, Fig. 4 is an enlarged transverse sectional view through a portion of the bottom of the battery.

Corresponding parts in all the figures are designated by the same reference characters.

Referring to the drawing, which illustrates one possible embodiment of the invention, the numeral 1 designates one of the jars of a conventional storage battery, the bottom of the jar being provided with the usual bridge members 2 which are transversely arranged and which provide a support for the lower edges of the positive and negative battery plates 3 and 4 respectively. These plates may be of any conventional construction, being shown in the present instance as in the form of grids which are filled with a paste 5 of the usual and well-known composition. The top of the jar is provided with the usual vent 6 and also with the posts 7 and 8 which are connected with the respective sets of battery plates and engage the usual straps of the storage battery. These features are all of the well-known and conventional construction, and no claim to novelty is based thereon.

Interposed between the battery plates 3 and 4 are the main separators 9 which are formed of some insulating material of a character that will resist the action of the acid solution or electrolyte with which the jar is filled. The main separators 9 are frequently in the form of thin sheets of wood, and, in the embodiment of my invention which I have illustrated, these conventional separator sheets can be used. However, an auxiliary reinforcing strip 10 is arranged at the bottom of each of the main separators 9. These auxiliary strips 10 are shown as having an L-shaped cross section, being provided at the lower edges thereof with lateral flanges 10ª which extend under the adjacent battery plates. With this construction the battery plates engage the L-shaped auxiliary separator strips in such a manner as to hold the said auxiliary strips firmly in position and prevent them from working up in the battery or otherwise shifting out of proper position. Any suitable insulating material which will resist the action of the acid solution or electrolyte may be used in the formation of the auxiliary strips 10, and one material which I have found to be giving satisfactory results is celluloid.

The positive and negative battery plates 3 and 4 are assembled in the jar in the usual manner with the main separator sheets 9 interposed between the same. One of the auxiliary reinforcing strips 10 is arranged at the bottom of each of the main separator sheets 9 and extends the full length of the lower edge thereof. The body portion of the auxiliary strip 10 extends upwardly an appreciable distance, while the lateral flange 10ª thereof projects under an adjacent battery plate so as to coöperate therewith to hold the strip 10 in proper position. It has been found in practice that the ordinary separators, such as those indicated at 9 are frequently worn through or damaged at the lower edge portions thereof by rubbing and buckling of the metal battery plates, and that short-circuiting of the plates occurs most frequently at this point. The auxiliary strips 10 are formed of some thin, tough material, such as celluloid, which will resist the rubbing action on the plates and render it practically impossible for the plates to come into contact with each other and be short-circuited at the lower edges thereof. One of the great weaknesses of the storage battery is thus remedied, with the result that the life of the battery is prolonged and greater efficiency obtained therefrom.

While I have specifically illustrated and described one particular embodiment of my invention, it will be obvious that numerous modifications and changes can be made in the construction without departing from the spirit or scope of the invention as defined by the appended claims.

Having thus disclosed my invention I claim and desire to secure by Letters Patent:

1. The combination with a battery including a jar and plates, of separators interposed between the plates, and L-shaped reinforcing strips applied to the lower portions of the separators and having the flanged lower edges thereof extending under the respective battery plates, said strips being separable from the other elements and being held in position of service by engagement with the other battery elements when the latter are assembled.

2. The combination with a battery including a jar and plates, of separators interposed between the plates, and celluloid reinforcing strips applied to edge portions of the separators.

3. The combination with a battery including a jar and plates, of separators interposed between the plates; and reinforcing strips associated with the lower edges of the separators and having portions which extend under and engage the lower edges of the plates to hold the reinforcing strips in position when the battery parts are assembled in operative position, the reinforcing strips being separate elements and being removable when the battery elements are taken apart.

4. The combination with a battery including a jar and plates, of separators interposed between the plates, and reinforcing strips interposed between the separators and the plates and extending transversely thereof at their lower edges, said reinforcing strips being formed with foot flanges which extend under the plates and coöperate therewith to hold the reinforcing strips in position of service when the battery elements are assembled, said strips being separate and removable when the battery elements are taken apart.

5. The combination with a battery including a jar and plates, of separators interposed between the plates, and flanged celluloid reinforcing strips interposed between the lower edges of the plates and separators and extending transversely thereof, the flanges projecting under the plates to hold the celluloid reinforcing strips in position of service when the battery elements are assembled and the strips being separate and removable when the battery elements are taken apart.

In testimony whereof, I have signed my name to this specification in the presence of two subscribing witnesses.

SAMUEL R. GUY.

Witnesses:
 CHARLES P. ROSS,
 J. CALVIN BROWN.